Jan. 30, 1951     W. E. RUSHING     2,539,862
AIR-DRIVEN TURBINE POWER PLANT
Filed Feb. 21, 1946     4 Sheets-Sheet 1
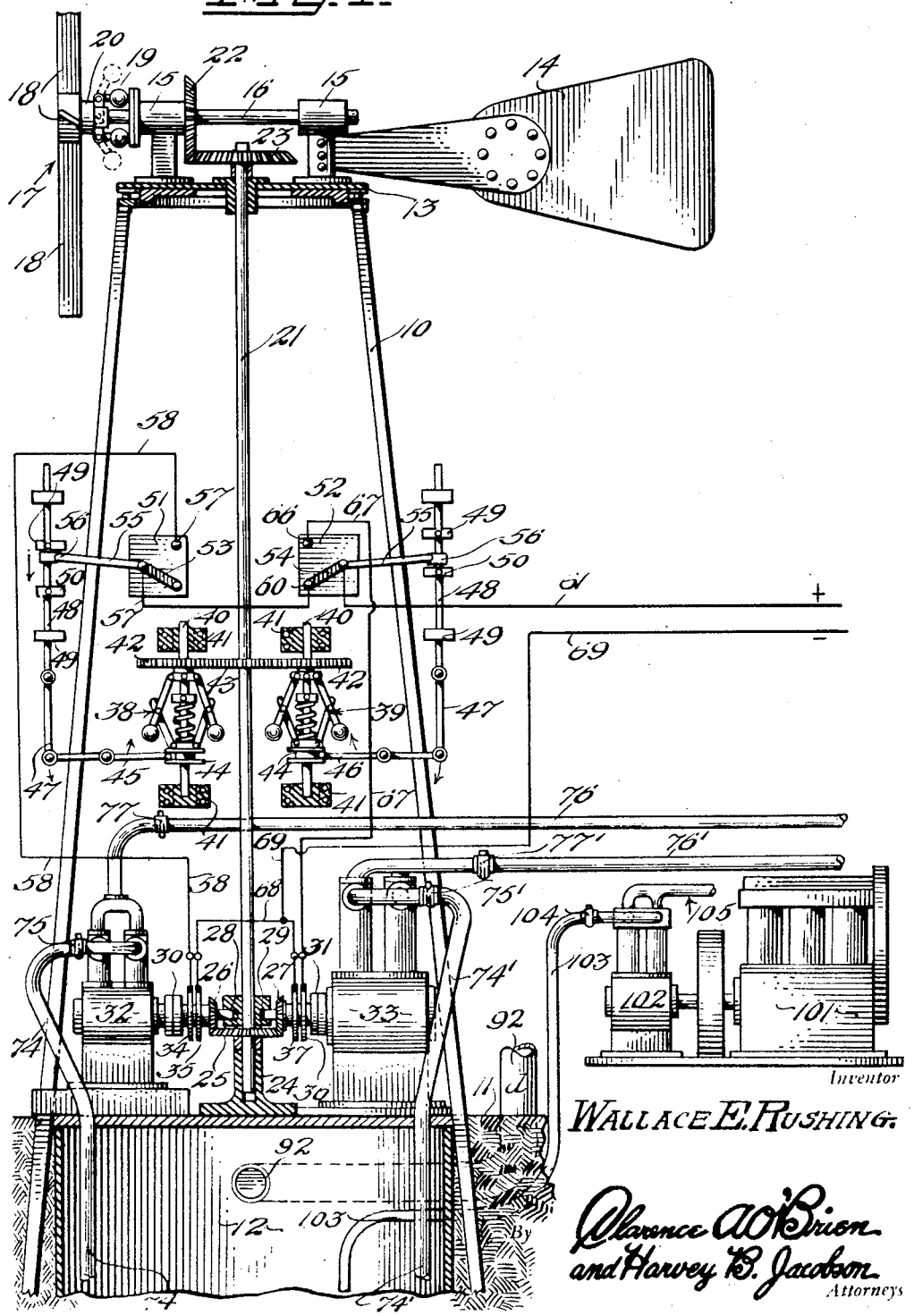
Inventor
WALLACE E. RUSHING
By Clarence A. O'Brien
and Harvey B. Jacobson
Attorneys

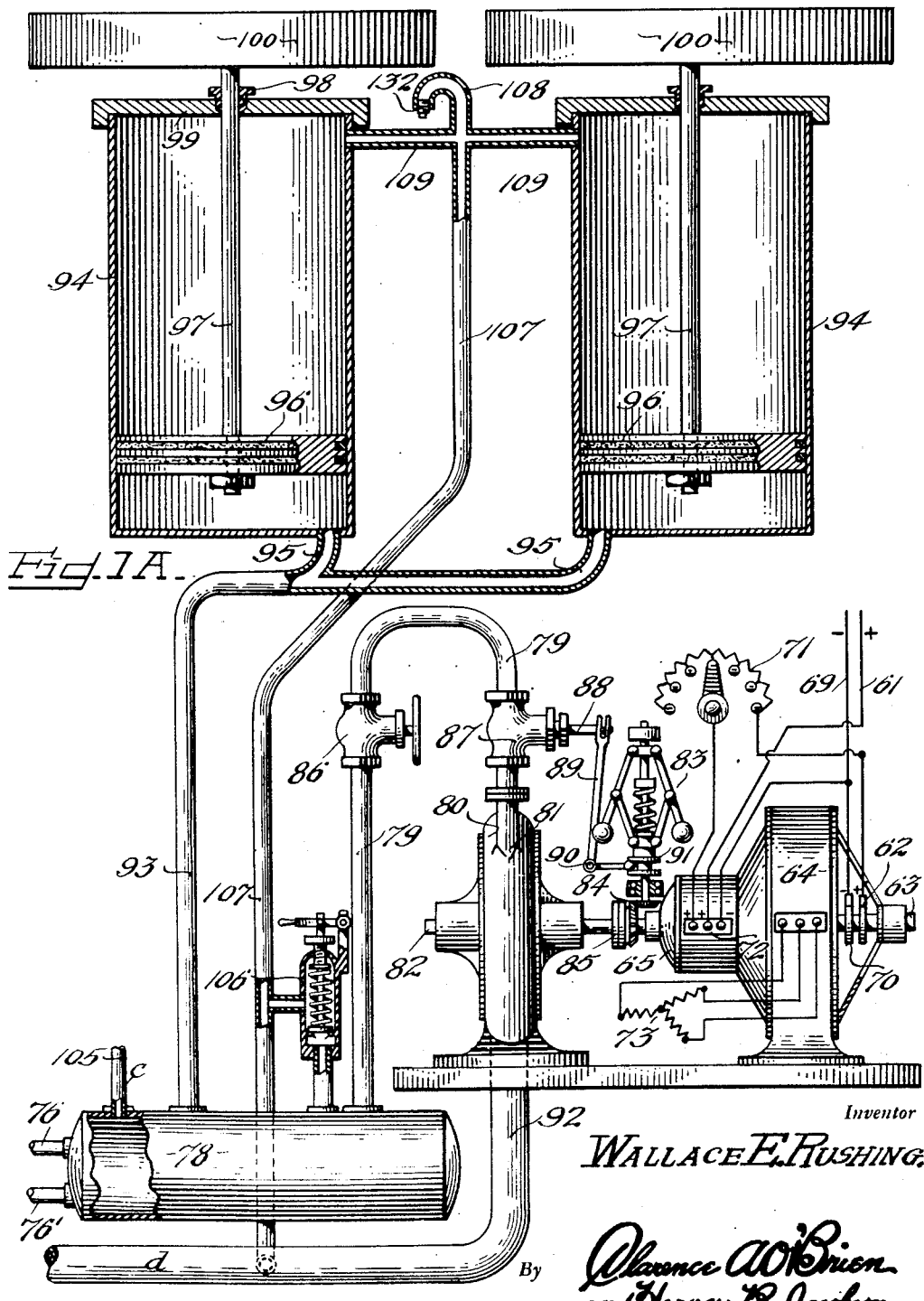

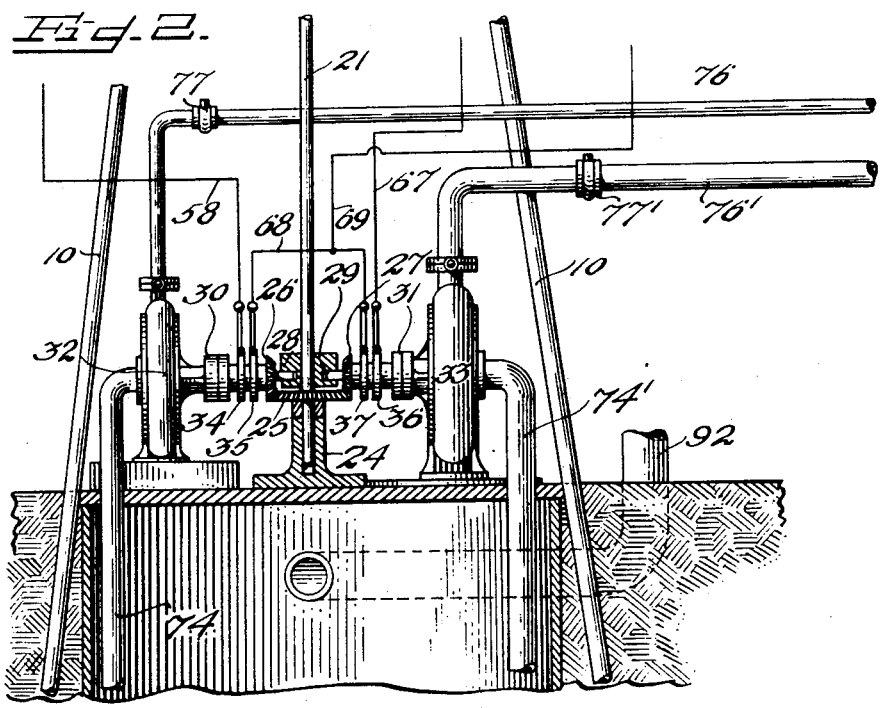
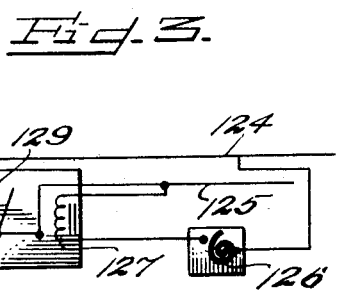
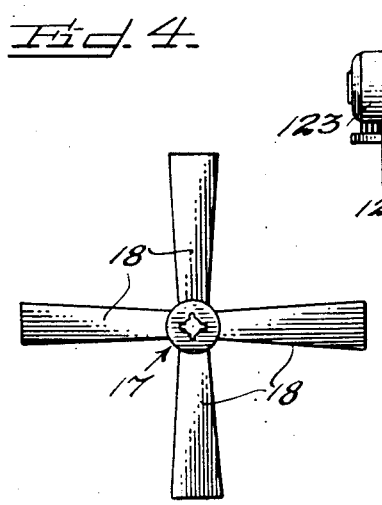
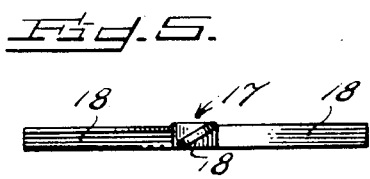

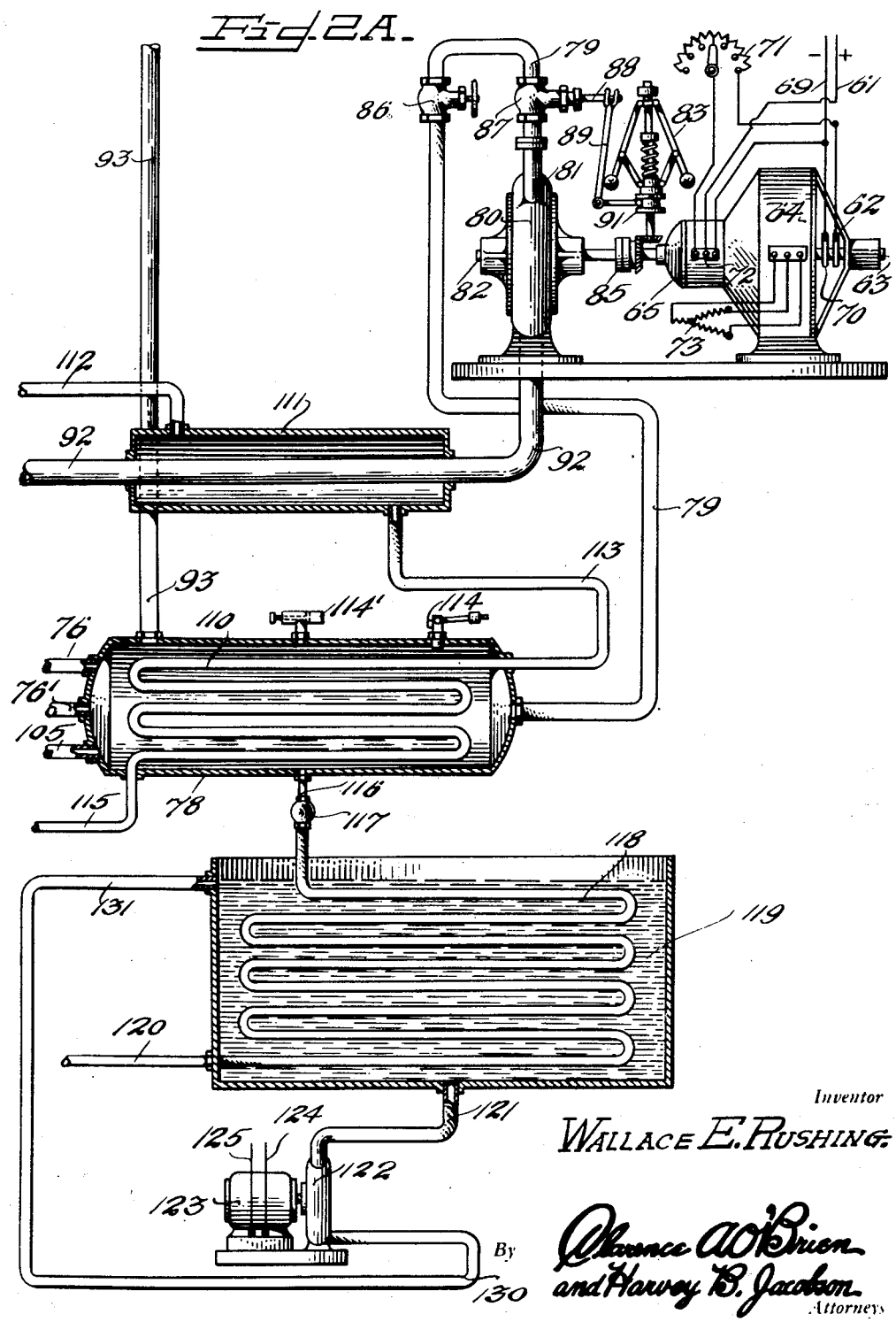

Patented Jan. 30, 1951

2,539,862

UNITED STATES PATENT OFFICE 2,539,862

AIR-DRIVEN TURBINE POWER PLANT

Wallace E. Rushing, Cristobal,
Panama Canal Zone

Application February 21, 1946, Serial No. 649,331

8 Claims. (Cl. 62—115)

My invention relates to an air driven turbine power plant, employing a wind wheel or impellers for driving a plurality of pumps when liquid is used in the system and compressors when a fluid, air or gas is used as the coupling media between the air section and the turbo-electric section, said pumps or compressors being of any type suitable for the liquids or fluids or gases used but preferably of the reciprocating type due to the high pressure contemplated in some versions of this design. The liquid or fluid is stored under pressure in suitable chambers or accumulators for operating one or more electrical generators thereby from which power is derived to supply various purposes. It is obvious that by using a suitable refrigerant, fluid or gas refrigeration may be also provided. The primary object of the invention is to provide air driven turbine-power plant in which the wind wheel or impeller is set with its blades at a certain or most efficient pitch and to maintain this most efficient pitch under all normal operating conditions as the efficiency of the wind wheel or impeller is directly dependent on the correct pitch in respect to its speed of rotation. In order to obtain maximum efficiency, this pitch or angle of the blade will be small and the speed of rotation will be high compared to the conventional wind mill. Certain novel and improved features will be apparent which makes this small angle of pitch feasible, and which in turn allows for the high speed rotation of the wheel or impeller in order to develop maximum power. This wind wheel or impeller is essentially a constant high speed device and this constant speed is maintained with varying wind velocity by varying the connected load in proportion to the changes in the wind velocity as will be seen later. A centrifugal ball type governor is provided as a safety device. It influences the pitch of the blade only after dangerously high speed is reached. When this condition is reached the spring loading of the governor is overcome by centrifugal action of the balls and the blades are turned or feathered with their edges to the wind so that the wheel or impeller will slow down and avoid being damaged. At all other times except under storm conditions the governor is of such a setting that it exerts no influence over the blades and the R. P. M. of the wheel or impeller is controlled by connecting or disconnecting appropriate size pumps or compressors in respect to wind velocity. This method allows full use of wind velocity. This method allows full use of fixed pitch blades for maximum power development far in excess of the conventional wind mill. This small angle of pitch is further rendered possible because no appreciable load is on the wind wheel during its starting period as in the case with the conventional wind mill which requires a relatively greater pitch to provide the starting torque due to its connecting load. In my design, as the velocity of the wind increases and the speed of wind wheel or impeller gains speed the drive mechanism from the impeller is set to successively connect or clutch a plurality of pumps or compressors depending on whether a fluid or liquid is used in the system, individually to a storage chamber or accumulator for storage of the liquid or fluid under pressure which is used in connection with the turbo-electrical generator for producing electrical current or kilowatts for various power purposes, and refrigeration if desired, and control any circuit by the switches which individually clutch the pumps or compressors in a series or battery thereof, for producing the necessary hydraulic or hydro-dynamic pressure for operating a turbine or a reciprocating engine to drive the electrical generator or for producing refrigeration.

Another object is to provide for the storage of the liquid or fluid under pressure so that the same may be used as a starting medium when the velocity of the wind is low or practically nil and to provide a stand-by power means such as a Diesel or internal combustion motor for use in supplying the necessary hydraulic or hydro-dynamic pressure for operating the electrical generator when there is no wind or to provide refrigeration if required where a suitable fluid or gas is used as a coupling between the wind wheel and the turbine and generator driven thereby, in sections of the world where wind does not blow for considerable periods so that maintenance of the efficiency of the plant may be secured.

Another object of the invention is to provide means for relieving the system and storage chamber or chambers of excessive pressure and for assistance in maintenance of pressure as well as scavenger means to take care of small amount of leakage that may develop past the pistons employed with suitable weighted means for assisting in the maintenance and discharge of such liquid or fluid under pressure for actuating the turbine or reciprocating engine or refrigeration and driving the turbo-electric generator therefrom. Said turbine may be of the gear, the reaction or of the impulse type and the reciprocating engine may be of the constant displacement type, double action, single action, oscillating or any type suitable for the purpose at hand.

Another object of the invention is to provide a stand-by or auxiliary source of power for driving a pump or compressor discharging directly into the system so that any excess liquid or fluid not immediately required for the turbine, reciprocating engine or refrigeration may pass into the high pressure receivers or accumulators, an advantage thereof being that the same could be relatively small and merely a fraction of the capacity of the wind wheel because peak demands would be largely anticipated and during unfavorable winds the auxiliary motor would be started prior to the peak demand and build up a reserve before these high demands arose and since these peak demands would be of short duration and the system capacity would be maintained at all times, and since this auxiliary source of power is independent of the wind wheel it would operate simultaneously with the wind wheel which would be furnishing all available power from the wind. This auxiliary power means would always operate at its designed load-speed curve which insures utmost fuel economy which is an additional important factor for economy in the operation of the plant.

A still further object of the invention is to render the operation of the plant independent of any existing steam or hydro-electric generating plant except when an electric motor is used as a substitute for a Diesel or internal combustion motor and as a source of stand-by or priming power when the wind is not favorable and when extra heavy peak demands for electrical or refrigeration energy exceeds the capacity of the wind plant or for initial starting of the plant. This plant is self sufficient within itself. Nothing in the foregoing should be construed as not meaning that said wind plant can and will be used in a network power system in conjunction with existing hydroelectric generating and steam plants for commonly supplying the system power requirements with the wind plant used at full capacity of the available wind and with hydro and steam plants making up the deficiency under unfavorable wind conditions. In other words, the burden of generation will always be on the wind plant, and the hydro and steam plants with their high cost of fuel will be used only under unfavorable wind conditions.

Other objects and advantages reside in the details of construction and operation as more fully hereinafter described and claimed, reference being had to the accompanying drawings forming part hereof, wherein like reference numerals refer to like parts throughout, and in which:

Figure 1 is a sectional elevation partly diagrammatic, showing air driven turbine power plant in accordance with the invention, one section thereof being shown and, Figure 1-A is a similar view of the other section of the plant partially shown in Figure 1.

Figures 2 and 2-A are sectional elevations showing a modification of the plant for refrigeration purposes.

Figure 3 is a diagrammatic view showing the electrical control of the brine circulating pump.

Figure 4 is an enlarged face view of the wind wheel, and

Figure 5 is an edge view thereof.

Referring to the drawings in detail, 10 designates a wind mill tower frame or derrick anchored in the ground 11, beneath which is arranged a storage tank 12 for a liquid or air under pressure as a means for operating a turbine or reciprocating engine directly connected to an electric generator or for providing refrigeration. The wind-mill may be of conventional construction having a table 13 at the top adapted to be turned toward the wind by a tail or rudder 14 which may be adjustable as shown and which may be mounted upon a suitable frame on the table, including bearings 15 for a horizontal drive shaft 16. To the end of the shaft 16 opposite the tail or rudder 14 the wind wheel or impeller 17 is connected, having the blades 18 thereof normally arranged and adjusted at the proper pitch angle for highest efficiency at the designed speed for the wind wheel or impeller. These blades 18 have a constant pitch and the same angle at the hub as at the tip of the blade in order to provide uniform power all along the blade the latter being uniformly tapered from tip to hub. The proper angle is dependent upon the designed speed of rotation and this speed is maintained by varying the load as will hereinafter be seen.

The horizontal drive shaft 16 is operatively connected or geared to drive a vertical shaft 21 journaled in the top of the derrick or frame 10 by means of intermeshed gears 22 and 23, while the lower end of the shaft 21 is journaled or rotatably supported in a bearing 24.

Suitable normally inoperative or disengaged drive connections are provided between the shaft 21 and the pumps or compressors. As shown by way of example, a beveled gear 25 is fixed to the shaft 21 at its lower portion meshing with smaller beveled gears 26 and 27 fixed to shafts 28 and 29 journaled around shaft 21. Shafts 28 and 29 are adapted to be connected, by means of clutches 30 and 31, of the magnetic type to the shafts of high pressure hydraulic pumps or compressors 32 and 33, respectively.

In order to individually and successfully drive a plurality of pumps or compressors which is sufficient to effectively load the wind wheel at all normal wind velocities so as to make said wind wheel rotate within its designed speed range, means are provided to selectively throw into and out of operation the proper size pump or compressor, said proper size being dependent upon the strength of wind. This action is performed by governor operated switches which operate magnetic clutches when a predetermined speed of the wind wheel or impeller is reached, the governor operating at high speed connecting the larger pump or compressor and disconnecting the smaller pump or compressor. There are suitable adjustments on each governor to make it effective at a definite speed and by means of additional adjustment in the governor linkage an overlapping action or differential range is provided between the several governors to afford smooth operation over all normal wind changes.

Slip rings 34 and 35 are mounted on and revolve with the shaft of the pump or compressor 32, and further slip rings 36 and 37 are mounted on and revolve with the shaft of the compressor 33. Driven from the shaft 21 by geared connection therewith directly or through the shafts 28 and 29 are governors 38 and 39 shown as of the ball type having their shafts 40 mounted in bearings 41 suitably supported and carrying pinions 42 both in mesh with an intermediate pinion 43 fixed to or driven by the shaft 21. The movable sleeves 44 of the governors slide on the shafts 40 and are shown grooved to take the forked ends of levers 45 and 46 pivoted intermediately and having their outer ends pivotally connected by links 47 to slidably supported rods 48, each of which carries a pair of adjustable spaced switch-actuating collars 49 and 50 adapted to actuate switches 51 and 52. Said collars 49 and 50 are secured to rods 48 by means of set screws and are adjustable so as to operate said switches over a broad range of speeds of the governors. These switches have movable contact arms 53 and 54 with switch arms 55 connected to sleeves 56 slidable on the rods 48. Movable contact arm 53 is designed to cooperate with a fixed contact 57 connected by a conductor 58 with the slip ring 34. Conductor 58 receives its current through movable contact arm 53, the other end of said arm being connected by conductor 59 to contact 60 on switch 52, which in turn has its movable contact arm 54 connected through conductor 61 with the commutator 72 of the generator or exciter 65. Slip ring 35 is connected through conductor 68 to slip ring 37 and both said rings are connected to conductor 69, thus completing the circuit to clutch 30 when the governor actuated switch 51 is closed. Conductors 61 and 69 are shown connected to the positive and negative output terminals of a commutator 72 on the direct current generator 65 driven with and acting as the exciter for the alternating current generator 64. In big power installations where the additional expense is justified a suitable battery is provided to supply the conductors 61 and 69 and also furnish emergency lighting for the plant. This alternative will result in a more precise control of the alternator voltage since no sudden varying loads will be thrown on and off the D. C. generator which furnishes excitation to the alternator. It will be noted that the switch 51 has a single contact 57 from which the conductor 58 leads to the slip ring 34, while the switch 52 has a pair of stationary contacts including the contact 60 connected by the conductor 59 to the movable contact 53 in the switch 51. It can be readily seen that the purpose of contact 60 and conductor 59 is to break the control circuit to switch 51, when switch 52 is closed by the governor 39 and conversely to re-establish this circuit when the speed is not great enough to keep switch 52 closed. A contact 66 is connected by a conductor 67 to the slip ring 36. A conductor 68 connects the slip rings 37 and 35 mounted on the pumps or compressors 32 and 33, respectively at the clutches 30 and 31. The conductor 68 and slip rings 35 and 37 are connected by a common conductor 69 at the negative side of the circuit to D. C. exciter 65 mounted on alternator 64 and then to a slip ring 70 of the alternator 64 thus completing the circuit.

It is to be understood that whenever slip rings are referred to the connections are made at the usual brushes which ride the slip rings. The magnetic clutches 30 and 31 are of the conventional type. Positive conductor 61 is connected to a positive terminal of the D. C. commutator 72 of the exciter 65. Rheostat 71 is in series with the field windings of alternator 64 and connected to the positive output of the D. C. generator or exciter 65. The slip ring 62 is mounted on the shaft of alternator 64. Said rheostat 71 provides control over the output of the alternator 64 in the conventionl manner by regulating the field current. Slip ring 70 is connected to the negative terminal of exciter 65 at commutator 72 and the negative side 69 of the control circuit branches off this conductor. The commutator 72 is of the conventional type used in D. C. generators. There are three terminals on commutator 72. One positive terminal feeds the rheostat 71, another positive terminal feeds conductor 61 and the remaining terminal is the common negative feeding the alternator slip ring 70 and the negative control circuit 69. Both slip rings 62 and 70 are mounted on shaft 63 and revolve therewith to conduct excitation to the alternator 64 as clearly shown. The primary of a three-phase transformer 73 is shown at the output of the alternator 64 but any suitable power scheme may be substituted.

Pump or compressor 32 receives its intake through an inlet suction pipe 74 having an interposed check valve 75, preferably of the spring loaded ball type and said pipe extends to a suitable depth in the storage tank 12. The liquid or the compressible fluid, gas or air, is discharged from the pump or compressor 32 through a discharge or outlet pipe 76 also having an interposed check or non-return valve 77 and the liquid or fluid, gas or air, whichever is used as a coupling medium in the system, under high pressure, passes into a surge chamber or receiver 78. When a liquid is used 78 will be an ordinary tank. The portion of the liquid or fluid not immediately required for driving the turbine 80 or for expansion coils when refrigeration is used, passes to the battery of accumulators or pressure regulating storage chambers 94, two of which are shown to represent a plurality. Two or more pumps or compressors of successively higher capacity, with independent governors and switch controls, will be employed, two being represented as a plurality. In this instance the larger pump or compressor 33 is shown with a similar inlet or suction pipe 74' having an interposed check valve 75'. The discharge pipe 76' of said pump or compressor 33 feeds the liquid, fluid or gas under high pressure to the common receiver storage chamber 78 and said discharge pipe 76' has an interposed check or non-return valve 77'. The turbine 80 receives its supply of liquid or fluid through pipe 79 from receiver 78. Said turbine has a nozzle 81 through which the liquid or fluid is discharged, a single stage type being shown but several stages may be used. Shaft 82 of the turbine 80 is coupled to shaft 63 to drive the generator or alternator 64 and the D. C. exciter 65. Geared to this shaft is a precise speed control governor 83 shown as of the ball type and geared as at 84 to shaft 63. Obviously, the governor 83 is part of the turbine 80 assembly and any other form of drive may be employed for the governor 83 to regulate the speed of said turbine 80. A manually operated control valve 86 is interposed in the pipe 79. An alleviator either spring type or air type may be installed on line 79 between valve 86 and surge tank 78 to relieve transient surges or shocks when valve 86 is closed suddenly or governor 83 acts quickly, otherwise damage may be caused to the system due to these shocks, but for low pressure conditions said alleviator will not be necessary. Also interposed in the pipe 79 is a governor regulated, automatically operated speed control or throttle valve 87 which is designed to maintain a constant rotational speed of the shaft of the turbine 80. This may be done by making valve 87 in the form of a butter-fly or sliding gate valve having a stem 88 connected to a slotted bell-crank lever 89 pivoted as at 90 and having its other arm engaged with a grooved sleeve 91 slidable on the governor shaft so that the governor 83 will maintain the valve 87 open at reduced speed and partially close the same at higher speed by the centrifugal action of the weighted arms of the ball governor in a well known manner or to entirely close the same at excessive speed to prevent injury. The exhaust or outlet discharge from the turbine 80 for reuse, is through a pipe 92 into the storage or supply tank 12 which is open to atmospheric pressure when a liquid is used or is sealed when a compressible fluid is used. The pressure on tank 12 is dependent on the medium used in the system. With certain refrigerant gases used said tank may operate with a vacuum but in all cases this pressure will be low relative to that in receiver 78.

Any excess of fluid, under pressure in storage chamber 78 over that required to drive the turbine 80, passes through an outlet pipe 93 into the bottom of a plurality of overflow storage accumulators or cylinders 94 shown as two in number and supported at any convenient height and upright position with branch pipes 95 leading from the pipe 93 through the closed lower ends of the cylinders 94 to be stored for use as a reserve or when a sudden peak demand arises or for starting or priming purposes and which also act as an automatic means of maintaining fixed pressure and directly aiding in precise frequency control of the alternator 64 since governor 83 working at this fixed pressure is partially relieved of regulation by this fairly closely regulated pressure. This storage energy maintains the output power capacity of the plant when the wind is not entirely favorable and in the event of a complete collapse of wind velocity this reserve energy allows ample time to bring the Diesel or combustion motor, or other auxiliary shown at 101 into efficient operation. Properly packed pistons 96 move up and down in the cylinders 94 and have their piston rods 97 extending upwardly and movable through packing glands 98 in the securely held heads 99 of the cylinders 94. The upper ends of the piston rods 97 bear weights 100 of such magnitude as to cause a constant predetermined high pressure on the liquid or fluid. The constant pressure head provides for high efficiency for operating the turbine 80 and for refrigeration purposes when required. The auxiliary 101 is preferably a Diesel engine but can be any internal combustion engine, gas turbine, electric motor or other suitable source of power. This auxiliary is coupled to pump or compressor 102 having its intake through a suction pipe 103 leading from the storage chamber 12 and having interposed check valve or non-return valve 104. The discharge is through pipe 105 which leads to the receiver or storage chamber 78 for maintaining the pressure therein or to bring it to a sufficiently high point to drive the turbine or engine 89 and maintain the plant in operation. It will be seen that this auxiliary is completely independent of wind velocity and may be readily operated simultaneously with the pump or compressor 32 or 33 thereby utilizing all wind power and employing auxiliary 101 as a supplementary to the wind power. Motor or engine 101 for this reason can be a fraction of the capacity of the main plant. A safety valve 106 is provided on the receiver 78 and connected to an overflow and vent pipe 107, which pipe leads to storage tank 12, to relieve abnormal pressure on the system. This safety valve is set at a slightly higher value than the normal designed operating pressure. It is further contemplated in installations designed for automatic operation to provide any suitable or additional pressure control devices in addition to safety valve 106. The pipe 107 is provided at the top with a fitting or vent 108. When the system is used with a liquid or with air, this fitting will act as a vent. In cases where a fluid is used, especially a refrigerant gas, this fitting will be gas tight and may be used for introducing fluid or gas into the storage chamber or to purge the system of unwanted gas or gases. Connections or ports 109 are provided from the pipe 107 to the tops of cylinders 94 and constitute scavenger openings to take care of the small amount of leakage past the pistons that will collect on the top of pistons 96 and return it to storage tank 12. With a prolonged strong wind or a low demand on the turbine or engine the pressure cylinders will be filled and abnormal pressure will develop in the system. To prevent damage under these conditions, valve 106 relieves this abnormal pressure and returns it through pipe 107 to storage chamber 12 directly or through discharge exhaust or return pipe 92 of the turbine or engine 80, for reuse.

In practice, and in the operation of the plant, initially there is no appreciable wind load on the wind wheel or impeller other than that necessary to drive the shafts and automatic controls or governors 38 and 39 or a plurality of any number, since the magnetic clutches 30 and 31 are disengaged and thus the pumps or compressors 32 and 33 are idle. This design disregards the starting torque which would call for a relatively high angle of pitch of the wind wheel blades and which would be very inefficient as soon as the wind wheel or impeller gained operating speed. This feature of large pitch of the blades necessary for initial or quick starting is what makes the conventional wind mill inefficient due to the necessity of a compromise pitch design between that required for quick starting and the most efficient operating pitch. My design completely ignores the large starting pitch and concentrates on the lesser most efficient pitch that will produce power after the wind wheel or impeller has attained its designed operating speed and said lesser, most efficient pitch is maintained at all normal operating speeds. As a safety measure, governor 19 is provided, said governor during storm conditions comes into action and through linkage feathers the blades 18, thereby slowing the wind wheel or impeller to a safe speed until the velocity of the wind subsides. That is, the wind wheel or impeller is adjusted by setting its blades at a certain and most efficient angle of pitch and maintains this most efficient pitch under all normal operating conditions as the efficiency of the wind wheel is directly dependent on the correct pitch in respect to the speed of rotation. Said wind wheel or impeller will at all times of operation be a constant speed device with rather broad limits and its speed will vary little. The reason for this is that with a strong wind, a large compressor will be connected and driven by the wind wheel and thus a heavy connected load will be placed on it. With a weak wind a smaller compressor will be connected or driven, and thus a corresponding light load will be placed upon it. In other words, the connected load will at all times be in proportion to the available wind, therefore, the wind wheel or impeller will turn or revolve at its designed, or relatively constant, speed at all times so as to take advantage of the pitch of the blades and extract the maximum power from the available wind. Constant speed, does not mean an absolutely and rigidly constant speed, as the governors will have to operate in steps within narrow speed variation limits. The term "constant" is therefore used in a broad sense and merely indicates a fairly constant speed in comparison with other types of wind wheels. To give an example there will not be more than a 100 R. P. M. difference in its rotational speed even under extreme conditions between a gentle breeze and a gale, although there will be a slight variation between the limits. The governor on the wind wheel or impeller is solely for storm protection. It has no function other than to protect the assembly from dangerous winds. It does not control the pitch of the blades, except as a safety measure. Only after all available load is connected and the wind is so strong as to continue to make the wind wheel or impeller gain speed, then and only then does this governor come into action and feather the blades through linkage, so as to protect the blades. At normal operating speeds this governor is loaded by having light balls and a heavy spring to a point where it is normally inoperative and requires a tremendous R. P. M. to overcome this heavy loading. This wheel is not to be confused with the conventional feathering types of blades as used on ordinary wind mills, that have been patented years ago. While it is not desired to be limited thereto, not more than four blades are contemplated in its design and they will turn at as high a speed as mechanical and structural limitations will permit and efficient use will be made of the angle of pitch and this high speed for high production in accord with modern aero-dynamic laws. To express this in another way, we know that a certain angle of pitch will produce the most power when the wheel is rotating at a given speed, but that this said angle will not be efficient at greatly altered speeds, therefore this design seeks means to prevent too great a speed variation, so that the correct angle of pitch can be decided upon and then make the wheel operate at the speed most desirable. This can be accomplished in this design because the initial starting torque is very light, only being enough to overcome the friction of the shafting and gearing as all other load is de-clutched. This being the case the only consideration is setting the pitch for efficiency after the wheel has gotten up to its operating speed. This angle is small compared to what the angle would have to be, if it had to overcome a heavy initial starting load as in the conventional wind wheel. As an example in this design the angle can be as small as 20°, more or less. If I did not provide automatic de-clutching and had to start the wheel under load, this angle would have to be increased to something approaching a 45° angle in order to provide a heavy starting torque and then this big angle would not produce power efficiently at the higher speeds of operation and some sort of "variable-pitch" scheme would have to be used, but which this design does not contemplate using, as by varying the load connected and holding the pitch constant, better efficiency will be realized.

When the wind wheel or impeller gains operating speed the drive mechanism through a light loaded governor 38 closes switch 51 and energizes magnetic clutch 30 which starts pump or compressor 32. This continues, provided the wind is not strong. If the wind velocity is strong the wind wheel or impeller will continue to gain speed, even with this connected load, then the second governor 39 which has a little stronger loading will come into action and close switch 52, which in turn simultaneously de-energizes magnetic clutch 30 and energizes clutch 31 which connects the larger pump or compressor 33 so as to impose a larger load on the wheel and take advantage of the increased wind velocity and slow the wind wheel or impeller down to its designed speed in order to efficiently use its designed pitch angle of blades. As many as twelve of these pump-compressor-governor combinations may be employed in order to cover a large wind variation and maintain the speed of the wind wheel or impeller within its designed speed range. Collars on rod 48 are provided so that adjustment of the switch action can be varied so as to overlap the governor action and provide smooth clutching and de-clutching operations. As an example, due to the spacing of collars 49 on rod 48 of governor 38 the speed of the governor may change within fixed small limits, without operating the switch 51. This is necessary so that an appreciable acceleration of the wind wheel or impeller would have to occur before governor 39 takes over, then when this acceleration does take place and switch 52 is closed, it immediately slows down the impeller due to the larger load and if the wide spacing of collars was not provided on governor 39 assembly, this reduction in speed would shift control right back to governor 38. This differential "lagging action" provides for smooth and proportioned load in respect to wind velocity.

As previously stated a plurality of pumps or compressors are employed progressively increasing in size or capacity and while only two are shown they constitute the representation of a plurality which may vary from two to eight or more. The pumps or compressors being represented as installed at a suitable level or on the grade line in the drawings. This arrangement is excellent for small plants, however, in the case of large industrial installations the required length and weight of shaft 21 would become prohibitive, and therefore, the pumps or compressors will have to be mounted at a suitable higher elevation in order to reduce the length and weight of shaft 21. The pump or compressor 32 is shown of relatively small size and thus as the impeller or wind wheel 17 is driven it drives the shaft 21 through the shaft 18 and the drive connections or gearing connecting the same, but since the clutch 30 is initially or normally disengaged, the pump 32 will not be initially driven, until the speed of shaft 21 reaches sufficient R. P. M. and governor 38 actuates switch 51 thereby energizing magnetic clutch 30 through conductors 61 and 59 through arm 53, contact 57, and conductor 58 to slip ring 34 with return through slip ring 35 and conductors 68 and 69. The governor 38 is set to operate at a lower speed than governor 39. The linkage is suitably pivoted to the rod 48. Collars 49 and 50 are slidable on rod 48 and may be adjusted as by set screws, so as to provide a differential or overlapping action between the governor 38 and the governor 39. This differential or lagging action is necessary for smooth operation. Switch 51 preferably of the quick make and break type will close immediately after shaft 21 has obtained the desired rotational speed by virtue of the action of governor 38 bringing collar 49 into contact with switch arm 55. Due to the spacing provided between collars 49 and 50 switch 51 will remain closed with a slight variation in speed of shaft 21, however, when shaft 21 due to the strength of wind greatly exceeds the setting of governor 38 it trips governor 39 which is designed to come into operation at a higher R. P. M. than is governor 38.

With the increased rotational speed of shaft 21 governor 39 trips switch 52 thereby transferring the positive conductor 61 from contact 60 which de-energizes magnetic clutch 30 as will hereinafter be more clearly seen. With the transfer of contact arm 54 to contact 66 to connect positive conductor 61 with conductor 67 and slip ring 36, clutch 31 will be energized since the negative conductor 69 runs directly to conductor 68 and slip ring 37 of said clutch 31 and also to slip ring 35 of clutch 30 as can be clearly seen. As previously pointed out, slip rings 34 and 35 are companion rings mounted on and rotate on the shaft 28 and by means of brushes on the slip rings energy is supplied to the magnetic clutch 30. Likewise, companion rings 36 and 37 are mounted and rotate on shaft 29 of pump or compressor 33. As will be seen, the spacing of collars 49 and 50 on the rod 48 of governor 39 will allow a slight variation in the speed of the shaft 21 without effecting the operation of switch 52. With a greatly diminished speed of shaft 21 governor 39 will bring collar 50 into contact with arm 55 thereby transferring arm 54 to contact 60 thereby breaking contact 66 and de-energizing clutch 31 and at the same time energizing conductor 59 and contacts 53 and 60, switch arm 53 being in contact with contact 57 by virtue of the governor action 38. This allows magnetic clutch 30 to be energized at this lower R. P. M. until such a time as the wind diminishes to such a value that governor 38 will remove all connected load from the wind wheel or impeller or in the case the wind increases instead of diminishing, governor 39 will come into operation again as previously described. Thus by having a plurality of appropriate size pumps or compressors, the correct loading will always be placed on the available wind in respect to its strength or velocity thereby obtaining the maximum amount of power possible even from a weak wind. This is a great advantage over the conventional windmill since said windmill has a fixed load and will not work until the wind reaches a high enough velocity to carry its load and then when the wind increases beyond this value the wheel greatly overspeeds due to the fixed load and the wind wheel due to improper pitch works very inefficiently whereas in this design with an increased wind velocity and progressively increasing loads provided by a plurality of pumps or compressors such as 32 and 33, a heavier load is connected as described above, which maintains the correct rotation speed of wind wheel or impeller substantially uniform within certain limits or variables of constant speed to efficiently take advantage of the designed pitch of the blades. When pumps or compressors 32 or 33 are engaged, they store liquid or fluid in the chamber or receiver 78 and when there is an excess above the requirements of the turbine or reciprocating engine 80, the excess passes to accumulators 94. Liquid or fluid from receiver 78 drives turbine 80 which in turn is coupled to alternator 64 and generator 65, which is controlled by governor 83 which is connected to speed control or throttle valve 87 and maintains required amount of liquid or fluid to develop the required power. When refrigeration is required in addition to the electric power this system is readily adaptable for providing same by slight modifications, namely using anyone of the suitable refrigerant fluids such as ammonia or Freon as an example, providing the receiver 78 with suitable water coils to absorb the heat of compression and connecting an expansion system consisting of valve and coils preferably immersed in a suitable brine tank so that utilization may be made for storage during off peak periods but direct expansion may be employed without said brine storage tank. The return of the expanion coils will lead back to storage tank 12 as in the conventional refrigeration cycle, as will be hereinafter more fully described. The exciter 65 is integral with alternator 64 and supplies the alternator with requisite excitation and in addition, in small installations, supplies power to control circuit 61 and 69. As previously noted, the current to bus or conductor 61 does not pass through field rheostat 71 but is obtained from a separate brush on commutator 72. Power in this control circuit 61 and 69 is used for energizing the magnetic clutches 30 and 31 which imposes a varying load on the generator 65 which in turn will be reflected into alternator 64 and cause a varying output of said alternator. For this reason, preferably in a large installation where additional cost is justified, a suitable storage battery will be provided to furnish power to the control circuit 61 and 69. This battery will offer the additional advantage of providing emergency lighting during such time as the plant may be closed down, for purposes of maintenance.

When the wind is inadequate, auxiliary engine or motor 101 will come into operation to drive its connected pump or compressor 102 which is of the same type as 32 or 33 and is of such a size as to impose the most desirable load on 101 and in this fashion maximum efficiency with most economy will be obtained from the fuel. An advantage of an automatic system comprised of wind plants consists in the fact that, hydroelectric stations and steam plants, wind power can be used to conserve fuel at the steam plants and water at the hydro-electric plants during favorable wind conditions thus resulting in economies far beyond the present standards.

This design uses suitable operating pressures for tasks to be accomplished. When a liquid is used as a coupling medium, high pressure will be used, so as to store a large amount of energy in as small a space as possible, thus reducing the cost of accumulators. If the capacity of these accumulators is large enough to act as a reserve during unpredictable heavy peak demands, it will make the use of auxiliary motor unnecessary, except at infrequent intervals, when the wind is highly unfavorable, or at times during initial starting of the plant.

Under certain conditions, it may be desirable to use a refrigerant fluid or gas so as to provide extremely cheap and abundant ice making and cold storage facilities as a by-product to the primary purpose of electrical power generation, as would, as an example be the case in remote places, areas, farms or in Army or Navy supply bases where the only power required would be for lighting, but where on the other hand, large quantities of B. t. u. would have to be extracted from warehouses for the preservation of food. In these special applications, it is conceivable that the refrigeration angle would outweigh the power producing possibilities, but both can be accomplished with the invention as will now be described. In order to provide refrigeration, the liquid or fluid, particularly a gas, is stored under pressure in the accumulators or cylinders 94 for operating one or more electrical generators from which power is derived and as shown in Figures 2 and 2-A of the drawings, the storage chamber or receiver 78 receives the liquid or fluid, air or gas, which however is used as a coupling medium in the system under high pressure from the compressors 32, 33 etc. and compressor 102, where it is cooled by a coil 110, when a compressible fluid is used receiving its supply from a heat exchanger 111, shown as a closed cylinder, receiving the discharge from the turbine or engine 80 through the pipe 92 extending through said heat exchanger cylinder and having an inlet 112 receiving a supply of water from the city main, a spray pond, cooling tower or evaporative cooler. The discharge from the turbine or engine through the pipe 92, leads to the tank 12 which is sealed or closed at the top. The heat exchanger cylinder 111 is connected with an outlet pipe 113 leading to the coil 110 in the storage chamber 78 which receives the fluid under compression from the compressors 32, 33 and 102 or otherwise, through the pipes 76, 76' and 105. The outlet 113 from the heat exchanger 111 constitutes a cold water inlet from the heat exchanger through the coil 110 in the storage or storage chamber 78 which becomes a condenser, which is provided with a purging valve 114 shown at the top, for purging the system. The storage chamber or condenser 78 is provided with the usual outlet 93 leading to the accumulators or cylinders 94, and with a conventional refrigeration service or stop valve 114' of the one-way type, the usual outlet 79 to drive the turbine or reciprocating engine 80. The coil 110 has an outlet 115 to discharge the cooling water to a sewer, spray pond, cooling tower or evaporative cooler. The storage chamber or condenser 78 is also provided with a discharge 116 which is provided with an expansion valve 117 of either manual or thermostatic controlled type therein, leading to expansion coils 118 which may be disposed in a brine tank 119 containing calcium chloride and water or other conventionally used solutions, with a return or suction 120 constituting a discharge for the expansion coils 118, to the storage tank 12. The object of the heat exchanger 111, which may be of any suitable type, but which is shown as the commonly known tube within a tube type, or may be a shell and tube affair either of the single pass or multipass type, or a coil pipe wound directly around the exhaust or discharge 92 and welded thereto, is to cause the water flowing in at 112 and out at 113 to absorb the cooling produced in exhaust pipe 92, thus preventing an accumulation of frosting and at the same time increase the cooling efficiency of the cooling water which in turn allows a smaller condenser 78. The cooling produced in exhaust pipe 92 is the result of the expansion effect of the refrigerant as it passes from the high pressure side of the turbine 80 to the low pressure exhaust, therefore expanding which is undesirable except that as used for the purpose as outlined. By having the expansion coil 118 immersed in the brine tank 119, cold can be stored in the brine during periods of high wind or at times when the electric power demands are low, so as to carry over during periods when the wind may not be favorable. However, it is conventional practice and cheaper sometimes not to use a brine tank but to use direct expansion by putting the expansion coil in the cold storage compartment and mounting the same on the ceiling and walls where large areas of coiled surface is required. An advantage of using the brine tank, is that ice can be made in the conventional manner by suitable tanks immersed in the brine, thus producing ice making facilities.

The brine tank 119 is provided with an outlet 121 shown leading from the bottom thereof to a circulating pump 122 of the reciprocating or rotary type driven by a suitable motor 123 controlled manually or by a thermostat as shown. As illustrated, the supply lines for the motor are indicated at 124 and 125, the former leading to the motor 123 and to a bi-metallic thermostat 126 and then to an inductance coil 127 from which a return is made to the line 125. The motor control is in the form of a pivoted contact 128 actuated by the control coil 127 and the thermostat 126 may be of the bi-metallic type responsive to changes in temperatures. A contact 129 is adapted to be engaged by the pivoted contact 128 of the controller and is connected to the other side of the motor 123. Both the motor controller and thermostat may be of the standard types, the thermostat being located in the cold storage chamber or room, so that when the temperature rises, the movable contact 128 is operated to engage the stationary contact 129 to close the circuit to the motor 123 the latter will start and operate the circulating pump 122. When the contact closes by the temperature rises, under thermostatic control, the current flows from the line 124 to one side of the control coil 127 and the other side of the coil being directly connected to the line 125, causes said coil to become energized to close the pivoted contact 128 against the contact 129, which connects the motor 123 in the line 125 to close the circuit through the motor 123 and the line 124. The cold brine is pumped from the coldest part of the brine tank, at the bottom thereof, as shown, and is circulated through a brine coil 130 in the cold storage room to be cooled and returned to the top of the brine coil, or to the tank 119, as indicated at 131 to again circulate to the brine or refrigerating coil 130 for the necessary refrigeration of the cold storage room. In this way, it is possible to provide an extremely cheap and abundant ice making and cold storage facilities as a by-product to the primary purpose of electrical power generation as heretofore pointed out. This would be especially desirable and advantageous in places, such as, farms or in other remote locations, such as army and navy supply bases, where the only power steadily required would be for lighting, and also where refrigeration of warehouses for the preservation of food is desirable. In this connection, the vent 108, as previously described, is provided with a purging valve such as 114 provided on the receiver 78 at the top, or the same may be plugged gastight as indicated at 132, curved as shown, or with suitable pipe fittings forming said vent pipe 108. The tank 12 will have to be gastight but will have a lower pressure in respect to the high side or surge tank 78 as is necessary with any compressible fluid, except a liquid. In other words, the inlet side of the turbine will have a high pressure, whereas the exhaust or outlet side will have a low pressure, even a vacuum under some conditions. In refrigeration systems employing an extremely low temperature, a high vacuum is maintained, while in others, only a few pounds pressure is maintained on the low side or in the tanks 12. In either case, while the vent 108 is usable for liquid or air, when the compressible fluid is ammonia, or other suitable gas, the surging or refrigerating packless type of valve will be used in purging or for admitting refrigerating charge or for expelling the same as employed on the surge chamber or receiver 78. Tank 12 is a storage chamber at atmospheric pressure when liquid or air is used, but when a gas is used, it will be closed but the pressure in this side of the system will be low compared to the tank or receiver 78. When gas is used, the coils in the surge chamber or receiver 78 will absorb the heat in the gas produced by compression, while the expansion valve 117 in the outlet 116 provides expanded gas to the coils 118, shown immersed in the brine tank 119. This coil cools said brine and the coil exhausts at 120 to be returned to tank 12. The brine in 119 can be carried to an extreme low temperature during periods of high wind velocity or when the electrical demand on the plant is low, thus storing the cold to be used as the refrigerating demands may require. Coil 130 has no connections with 118. 130 is located in the room to be cooled, together with a thermostat, then the brine from 119 is circulated to maintain the temperature called for by the thermostat. Thus, refrigeration can be stored in the brine during periods when the demand on the electrical system is low and at such times when the wind is more than sufficient for purely electrical purposes.

In any case the liquid or fluid allows flexibility and precise frequency control of the alternator 64 under varying wind conditions, utmost efficiency is provided at all times. Refrigeration can be obtained as a by-product in addition to power generation, by using any of the refrigeration fluids or gases. Other advantages will be readily apparent in this design. The features covered in this design will be incorporated into a vastly improved wind turbine now in process of development and the combination will allow for automatic unattended plants tied together into vast networks to supply utilities which will result in the consumer obtaining power at a price undreamed of at the present time. No licensed personnel is required for the operation of these plants and maintenance will be limited to very small crews who will take care of a number of plants, thus effecting economies. The frozen food industries will especially benefit by this design as will governmental agencies, railroads, isolated factories, municipalities, and any one using enough power to justify the erection costs.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having thus described the invention, what I claim is:

1. A wind driven power generating system, comprising a wind operated impeller with blades, a power shaft driven by said impeller, a fluid driven engine, means to keep said engine at a constant speed, and means for driving said engine from said power shaft, including means for keeping the speed of the power shaft at a substantially constant value, said last named means including a closed fluid system, having a receiver supplying said engine and a series of fluid pumps of increasing size, alternatively connected with the power shaft and permanently connected with the closed fluid system.

2. A wind driven power generating system, comprising a wind operated impeller having blades, a power shaft driven by said impeller, a series of fluid compressing pumps of increasing size, a tank for supplying said pumps with fluid, a receiver connected with said pumps, a fluid driven engine supplied from said receiver with driving fluid, electromagnetic couplings for operatively connecting said power shaft with each of said fluid compressing pumps, operative circuits for the said couplings, a plurality of centrifugal governors driven by said power shaft, a switch associated with and operated by each of said centrifugal governors, closed and opened at given speed limits above and below a predetermined speed, each switch controlling the operative circuit of one of the electromagnetic couplings, each switch when operated cutting out the switch which has been previously operated, the increasing speed due to increasing driving power acting on the impeller, being counteracted by the increasing size of the load connected with the shaft by the centrifugal governors.

3. A wind driven power generating system, comprising a wind operated impeller, a power shaft driven by said impeller, a closed fluid circulation system, including a fluid tank, a receiver, a number of fluid compressing pumps of different and progressively increasing size, supplied by said tank and delivering into the receiver, a fluid driven engine, supplied with fluid from the receiver and delivering its exhaust into the tank, means for maintaining the speed of the fluid driven engine at a constant value, electromagnetic couplings for operatively connecting said power shaft with each of said fluid compressing pumps, operative circuits for the said couplings, a plurality of centrifugal governors driven by said power shaft, a switch associated with and operated by each of said centrifugal governors, closed and opened at given speed limits above and below a predetermined speed, each switch controlling the operative circuit of one of the electromagnetic couplings of each switch, when operated, cutting out the switch which has been previously operated, the increasing speed due to increasing driving power acting on the impeller being counteracted by the increasing size of the load connected with the shaft by the centrifugal governors.

4. A wind driven power generating system, comprising a wind operated impeller, a power shaft driven by said impeller, a closed fluid circulation system, including a fluid tank, a receiver, a number of fluid compressing pumps in progressively increasing size, supplied from said tanks and delivering into the receiver, a plurality of accumulators connected with said system and including cylinders, connected with said receivers, and weighted pistons in said cylinders, a fluid driven engine, supplied with fluid from the receiver and delivering its exhaust into the tank, means for maintaining said fluid driven engine at a constant operational speed, electromagnetic couplings for operatively connecting said power shaft with each of said fluid compressing pumps, operative circuits for said electromagnetic couplings, a plurality of centrifugal governors driven by said power shaft, a switch associated with and operated by each of said centrifugal governors, operated at given speed limits above and below a predetermined speed, each switch controlling an operative circuit of one of said electromagnetic couplings and each switch when operated cutting out the switch previously operated.

5. A wind driven power generating system, comprising a wind operated impeller, a power shaft driven by said impeller, a closed fluid circulation system, including a fluid tank, a receiver, a number of fluid compressing pumps of different, progressively increasing size, supplied from said tank and delivering into the said receiver, a fluid driven engine, supplied from said receiver and delivering its exhaust into the tank, means for maintaining the fluid driven engine at a constant speed, electromagnetic couplings for operatively connecting said power shaft with each of said fluid compressing pumps, operative circuits for the said couplings, a plurality of centrifugal governors driven by the said power shaft, switches associated with said governors and controlling the operative circuits of the electromagnetic couplings, each switch being provided with an operating lever and each governor being provided with two members for moving said operating levers into its closing and opening position respectively, one of said members being operative at the high limit speed and the other at the low limit speed, and each switch cutting out the switch previously operated.

6. A wind driven power generating system, comprising a wind operated impeller, a power shaft driven by said impeller, a closed fluid circulation system, including a fluid tank, a receiver, a number of fluid compression pumps of different, progressively increasing size, supplied from said tank and delivering into said receiver, a rotary fluid driven engine, provided with an exhaust tube leading to said tank, a refrigeration system including a brine tank and a cooling coil, connected with said receiver and a cooling coil within said receiver, said system being connected with said closed circulation system and said connection including a cooling tank, cooled by the expansion of the exhaust fluid from the rotary engine, connected with the cooling coil of the receiver, electromagnetic couplings for operatively connecting said power shaft with each of said fluid compression pumps, operative circuits for the said couplings, a plurality of centrifugal governors driven by said power shaft, a switch associated with and operated by each of said centrifugal governors, closed and opened at given speed limits above and below a predetermined speed, each switch controlling the operative circuit of one of the electromagnetic couplings of each switch when operated cutting out the switch which has been previously operated, the increasing speed due to increasing driving power, acting on the impeller, being counteracted by the increasing size of the load connected with the shaft by the centrifugal governors.

7. A wind driven power generating system, comprising a wind operated impeller, a power shaft driven by said impeller, a closed fluid circulation system, including a fluid tank, a receiver, a number of fluid compressing pumps of different, progressively increasing size, supplied from said tank and delivering into said receiver, a rotary fluid driven engine, provided with an exhaust tube leading to said tank, means for maintaining the same at a constant speed, a refrigeration system cooperating with said closed system and including a heat exchanger, means for supplying a fluid to the same, means for cooling the fluid within the heat exchanger by the exhaust fluid from the rotary engine, a cooling pipe supplied by the fluid passing through the heat exchanger, arranged in the receiver of the closed system, said refrigeration system further including a brine tank having a fluid circulating system connected with the receiver for cooling the fluid contained within said brine tank, electromagnetic couplings for operatively connecting said power shaft with each of said fluid compressing pumps, operative circuits for the said couplings, a plurality of centrifugal governors driven by said power shaft, a switch associated with and operated by each of said centrifugal governors, closed and opened at given speed limits above and below a predetermined speed, each switch controlling the operative circuit of one of the electromagnetic couplings of each switch and, when operated, cutting out the switch which has been previously operated, the increasing speed due to increasing driving power, acting on the impeller, being counteracted by the increasing size of the load connected with the shaft by the centrifugal governors.

8. A wind driven power generating system as claimed in claim 7, wherein the refrigeration system including said brine tank, further comprises a brine circulation system, including a brine pipe carrying off the heat from the parts to be cooled, a pump for circulating the brine in the pipe, the ends of said circulating pipe being connected with the top and bottom of the brine tank respectively.

WALLACE E. RUSHING.

REFERENCES CITED

The following references are of record in the file of this patent:

UNITED STATES PATENTS

| Number | Name | Date |
|---|---|---|
| 903,935 | Wilson | Nov. 7, 1908 |
| 1,362,753 | Sperry | Dec. 21, 1920 |
| 1,369,596 | Yanacopoulos | Feb. 22, 1921 |
| 1,443,664 | Vischer, Jr. | Jan. 20, 1923 |
| 1,533,467 | Sargent | Apr. 14, 1925 |
| 1,852,897 | Price | Apr. 5, 1932 |
| 2,080,955 | Watkins | May 18, 1937 |
| 2,112,633 | Moon | Mar. 29, 1938 |
| 2,246,940 | Hood | June 24, 1941 |
| 2,381,321 | Thiesen | Aug. 7, 1945 |

FOREIGN PATENTS

| Number | Country | Date |
|---|---|---|
| 32,437 | Denmark | Oct. 19, 1923 |